(12) United States Patent
Koslov

(10) Patent No.: US 6,236,283 B1
(45) Date of Patent: May 22, 2001

(54) METHODS AND APPARATUS FOR GENERATING A FILTERED SIGNAL HAVING A FIXED SAMPLING RATE FROM A VARIABLE BAUD RATE INPUT DATA STREAM

(75) Inventor: Joshua L. Koslov, Hopewell, NJ (US)

(73) Assignee: Hitachi America, Ltd., Tarrytown, NY (US)

(*) Notice: Subject to any disclaimer, the term of this patent is extended or adjusted under 35 U.S.C. 154(b) by 0 days.

(21) Appl. No.: 09/484,645

(22) Filed: Jan. 18, 2000

Related U.S. Application Data

(60) Provisional application No. 60/128,312, filed on Apr. 8, 1999.

(51) Int. Cl.$^7$ ............................. H03C 3/00; H04L 27/20; G06F 17/17
(52) U.S. Cl. ........................... 332/103; 375/308; 708/313
(58) Field of Search .................................... 332/103–105; 375/308; 708/313

(56) References Cited

U.S. PATENT DOCUMENTS

| | | | |
|---|---|---|---|
| 5,783,974 | 7/1998 | Koslov et al. | 332/103 |
| 6,091,765 * | 7/2000 | Pietzold, III et al. | 375/219 |
| 6,141,671 * | 10/2000 | Adams et al. | 708/313 |

OTHER PUBLICATIONS

Joshua L. Koslov, Frank Anton Lane, U.S. application No. 09/419,265, filed Oct. 15, 1999, pp1–34 and Figs. 1–6.

* cited by examiner

*Primary Examiner*—David Mis
(74) *Attorney, Agent, or Firm*—Straub & Pokotylo; Michael P. Straub

(57) ABSTRACT

A sample stream having a fixed sampling rate, representing a filtered version of an input symbol stream is produced by a pulse shaping and resampling device of the present invention. The pulse shaping/resampling device can be used as part of a digital modulator. In order to accommodate a wide range of ("variable") input baud rates, as part of the pulse shaping/resampling device, a filter having an integral upsampling ratio is used, followed by a resampler circuit having a finely adjustable resampling ratio. The resampler provides an average output rate equal to the desired fixed sampling rate. In various embodiments it is followed by a buffer, which smoothes the output to provide a uniform output rate equal to the desired fixed sampling rate. The pulse shaping/resampling circuit of the present invention may be used in place of a known pulse shaping circuit in a modulator to produce a modulator capable of supporting a wide range of input signal rates.

33 Claims, 5 Drawing Sheets

METHODS AND APPARATUS FOR GENERATING A FILTERED SIGNAL HAVING A FIXED SAMPLING RATE FROM A VARIABLE BAUD RATE INPUT DATA STREAM

RELATED APPLICATIONS

This application claims the benefit of U.S. Provisional Application No. 60/128,312, filed Apr. 8, 1999.

FIELD OF THE INVENTION

The present invention relates to methods and apparatus for generating digital symbol streams and, more particularly, to methods and apparatus which support multiple symbol rates, e.g., given a fixed sampling rate.

BACKGROUND OF THE INVENTION

The use of digital signals for the transmission of various types of information continues to grow in importance. Digital modulation is often an important part of the process of transmitting a digital signal. Digital modulation involves the mapping of bits into symbols, filtering the symbols into desired pulse shapes, and the translation of baseband pulses onto a carrier signal for transmission.

The mapping of bits into symbols involves, e.g., collecting N bits and mapping those bits into 1 of $2^N$ signal amplitude and phase values. Pulse shaping is used to limit the bandwidth of the signal to be transmitted to the desired channel bandwidth. It can be accomplished by a digital filtering operation and is often implemented as an FIR (finite impulse response filter). A mixing operation is often used to translate an information signal up to the carrier frequency for transmission purposes.

Given the reliability of digital integrated circuits as compared to analog system components there are advantages to moving to modulation systems which use all or mostly digital circuits. U.S. Pat. No. 5,783,974 discusses various digital modulators which use interpolation to increase the number of samples in the signal to be transmitted. While such systems may support a range of interpolation ratios, the supported ranges normally include interpolation ratios which are integer multiples of an input sample rate. For reasons of increased flexibility, it is desirable that at least some modulators be capable of supporting non-integer interpolation rates.

In view of the above discussion, it becomes apparent that there is a need for new and improved methods of implementing modulators and digital modulator circuitry. It is desirable that at least some of the new methods and apparatus support non-integer upsampling rates.

SUMMARY

The present invention relates to modulation methods and apparatus which support multiple symbol rates, e.g., given a fixed sampling rate.

The present invention uses a flexible pulse shaping/resampling device or stage to perform both integral and non-integral upsampling ratios following initial symbol generation, e.g, by a symbol mapper. The resampling stage of the present invention may be implemented using digital circuitry and, in accordance with the present invention can be used to perform pulse shaping in addition to resampling. Accordingly, the pulse shaping/resampling stage of the present invention can be used to serve the function of a modulator pulse shaping circuit.

The output of the pulse shaping/resampling device of the present invention provides fixed average rate samples used by subsequent circuitry, e.g., a mixer and interpolation/filtering circuitry.

The pulse shaping/resampling device of the present invention includes an interpolating pulse shaping filter, a resampling circuit, and, optionally, a buffer, e.g., a first-in, first-out (FIFO) queue. The interpolating/pulse shaping filter implements integral ratio upsampling and is used to provide coarse baud rate adjustment. It may be implemented by outputting the result of a filtering operation multiple, e.g., N, times during the time period corresponding to each input sample. The resampling circuit operating alone, or in conjunction with the FIFO queue, provides upsampling or downsampling by a finely adjustable ratio to achieve the finally desired sampling rate. In combination, the pulse shaping filter and resampling circuit can be used to achieve either integral or non-integral upsampling ratios.

As will be discussed in detail below, the pulse shaping/resampling device of the present invention can be used to implement a digital modulator which supports both integer and non-integer upsampling ratios thereby providing a greater degree of flexibility with regard to signal inputs than modulators which support only integer upsampling ratios.

Additional features and benefits of the present invention are discussed in the detailed description which follows.

DETAILED DESCRIPTION

Figure 1:
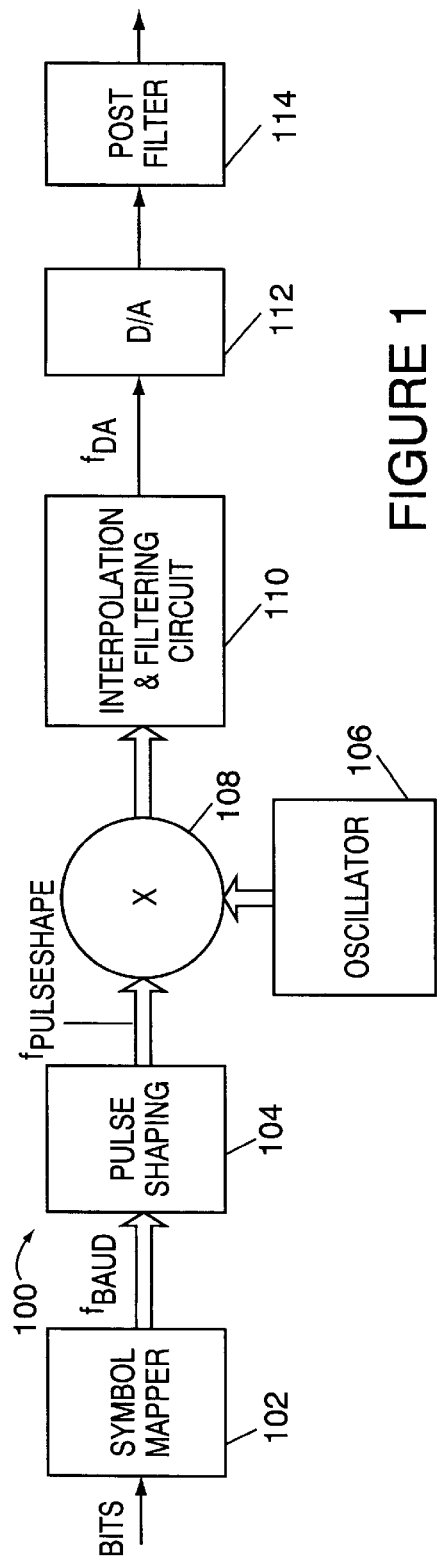
FIG. 1 illustrates a digital modulator which supports integer upsampling ratios.

FIG. 1 illustrates a modulator 100 which includes a symbol mapper 102, pulse shaper 104, oscillator 106, mixer 108, interpolation and filtering circuit 110, digital/analog converter 112, and postfilter 114. In the digital modulator of FIG. 1, the conversion rate of the D/A converter 112, $f_{DA}$, is a fixed rate generated, e.g., by a crystal oscillator or crystal oscillator with frequency multiplier. In the FIG. 1 example, the interpolation and filtering circuit 110 preceding the D/A converter 112, operates with a fixed upsampling ratio INTERPFIXED. Hence, the input to the interpolation and filtering circuit 110 is also at a fixed sampling rate $$f_{pulseshape} = f_{DA}/INTERPFIXED,$$

where $f_{pulseshape}$ is the sampling rate at the output of the pulse shaper, the input to the mixer, and the output of the mixer.

The pulse shaping circuit 104 takes inputs generated by the symbol mapper 102, and filters them as desired, typically with a square-root raised cosine Nyquist response. This pulse shaping filter also performs an upsampling of the symbol rate by a factor $INTFRP_{pulseshape}$, so that $$f_{pulseshape} = f_{baud} * INTERP_{pulseshape};$$

$$f_{baud} = f_{pulseshape} / INTERP_{pulseshape},$$

where $f_{baud}$ is the symbol rate.

The pulse shaping circuit 104 may be programmable in its upsampling rate $INTERP_{pulseshape}$, such that it supports upsampling by integral ratios, so that, for a given output frequency $f_{pulseshape}$, the possible baud rates are given by $$f_{baud} = f_{pulseshape} / N,$$

where N is an integer. This restricts the set of possible values for $f_{baud}$, the symbol rate, considerably.

Figure 2:
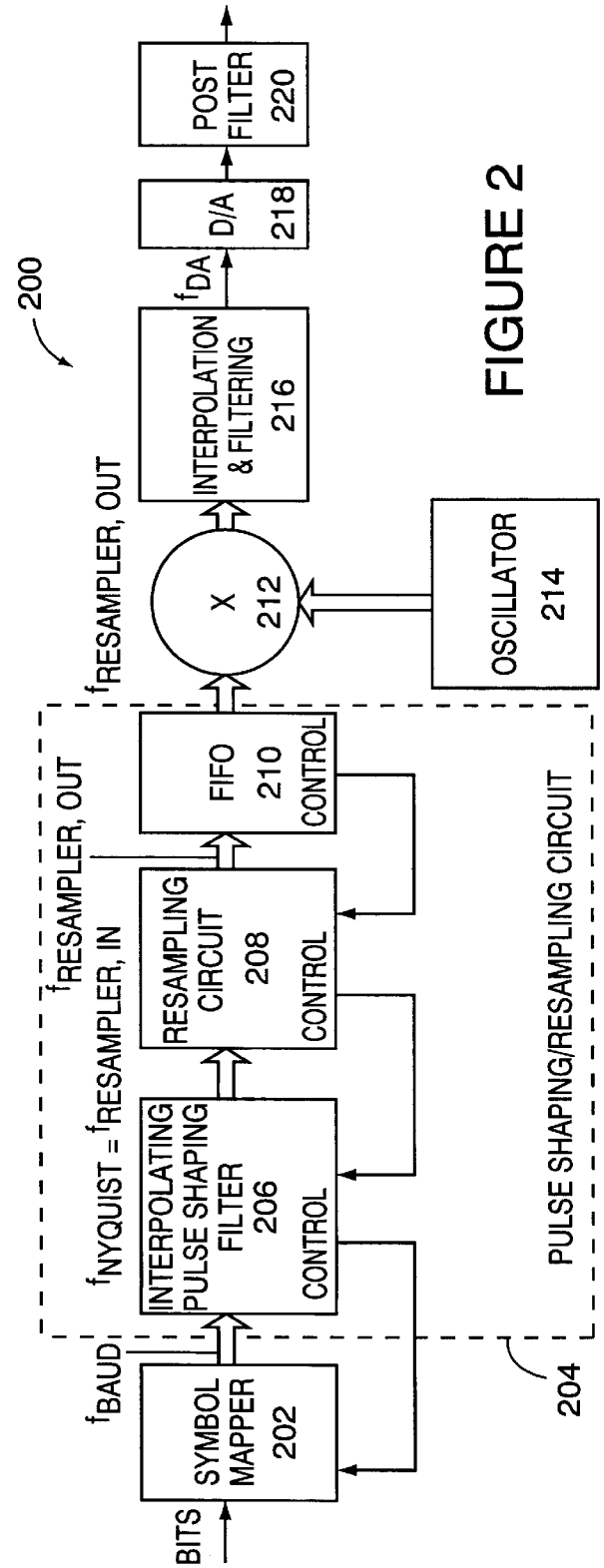
FIG. 2 illustrates a modulator implemented in accordance with the present invention.

An exemplary modulator 200 implemented in accordance with the present invention is illustrated in FIG. 2. The modulator 200 comprises a symbol mapper 202, a pulse shaping/resampling circuit of the present invention 204, a mixer 212, oscillator 214, interpolation and filtering circuit 216, D/A converter 218 and post filter 220. The mixer 212, oscillator 214, interpolation and filtering circuit 216, D/A converter 218 and post filter 220 serve a similar function, and are the same as or similar to the like named elements of the system 100 illustrated in FIG. 1. A data output of the symbol mapper 202 is coupled to a data input of the pulse shaping/resampling circuit 204. A data signal output of the pulse shaping/resampling circuit 204 is coupled to the data input of the mixer 212. Thus, the pulse shaping/resampling circuit 204 receives as its input symbols from the symbol mapper 202 and outputs interpolated symbols to the mixer 212.

The pulse shaping/resampling circuit 204 of the present invention includes a programmable filter, e.g., a programmable Nyquist filter 206, a resampling circuit 208 and a FIFO (first in, first out) buffer 210. The FIFO includes a resampling circuit control output which can be used to send a control signal to the resampling circuit, e.g., to enable/disable resampling circuit operation and thereby control the output rate of the resampling circuit 208. Similarly the resampling circuit 208 has a filter control output which can be used to send a control signal to the filter 206, e.g., to enable/disable filter operation and to thereby control the output rate of the filter 206. The programmable filter 206 has a symbol mapper control output that can be used to send a control signal to the symbol mapper 202, e.g., to enable/disable symbol mapper operation and thereby control the output of symbols by the symbol mapper 202.

The signal being processed by the modulator 200, e.g., bits corresponding to symbols, pass from the symbol mapper 202 to the filter 206. The signal then passes to the resampling circuit 208 prior to being passed to the FIFO 210 before being supplied to the mixer 212.

The programmable filter 206 performs interpolation at integral multiples of the symbol rate on the symbols received from the symbol mapper 202. The filter 206 includes a control input and a control output. Via the control input, the filter 206 can be instructed by the resampling circuit 208 to output a sample. Via the control output, the filter can request that the symbol mapper 202 output a symbol.

The filter circuit 206 can, and in one embodiment is, implemented as a Nyquist filter. For purposes of explanation, let us refer to the FIG. 2 filter 206 as a Nyquist filter with an upsampling ratio $INTERP_{Nyquist}$ and an output sampling rate of $f_{Nyquist}$. In other embodiments the upsampling filter 206 implements other than a Nyquist filter characteristic. The resampler circuit 208 takes input samples representing a periodically-sampled signal, having a sampling rate $f_{RESAMPLER,IN}$, and performs interpolation to create virtual samples at times representing a new sampling rate, $f_{RESAMPLER,OUT}$. The resampler circuit 208 can be implemented using the IIR structure described in the U.S. patent application Ser. No. 09/419,265, filed Oct. 15, 1999, which is hereby expressly incorporated by reference; it can also be implemented as an FIR resampling circuit. The resampler circuit 208 provides samples as needed or requested by the FIFO to maintain a preselected buffer fullness threshold. The resampler circuit 208 requests samples from the Nyquist filter 206 as required, and the Nyquist filter 206 requests symbols as required. The output sampling rate of the resampler 208 is less than, equal to, or greater than, its input sampling rate.

In one particular exemplary embodiment in which an infinite impulse response (IIR) filter structure is used to implement the interpolating filter, the filter output rate is:

$$f_{Nyquist} = f_{baud} * INTERP_{Nyquist} \geq f_{resampler,out};$$

$$INTERP_{Nyquist} \geq f_{resampler,out} / f_{baud}.$$

In such a case, the sampling rate at the input to the resampler will be $$f_{resampler,in} = f_{resampler,out} * INC,$$

where INC is a downsampling ratio, implemented by the resampling circuit 208. INC may, but need not be, an integer downsampling ratio. That is, $$INC = f_{resampler,in} / f_{resampler,out};$$

$$INC = (f_{baud} * INTERP_{Nyquist}) / f_{resampler,out},$$

and the baud rates now have the flexibility $$f_{baud} = (INC * f_{resampler,out}) / INTERP_{Nyquist}.$$

In an upsampling embodiment, INC will be an upsampling as opposed to downsampling ratio.

In the FIG. 2 embodiment, great flexibility can be achieved in baud rate, even if $INTERP_{Nyquist}$ is constrained to be an integer, since the resampling increment INC can have very fine granularity.

Although the sampling rates $f_{baud}$ and $f_{baud} * INTERP_{Nyquist}$ can have great flexibility in values, a simple clocking scheme for driving the symbol mapper 202 and Nyquist filter 206 is desirable. One way would be to generate clocks for every possible operating frequency $f_{baud}$ for the symbol mapper 202, and for every possible operating frequency $f_{baud} * INTERP_{Nyquist}$ for the Nyquist filter 206. Such a clock generation approach may be difficult, and can involve use of analog phase-locked loops. A simpler way to generate the symbol mapper and Nyquist filter clock signals is to use stuttering clocks as symbol mapper and Nyquist filter clocks. The use of stuttering clocks will be discussed further below.

Figure 3:
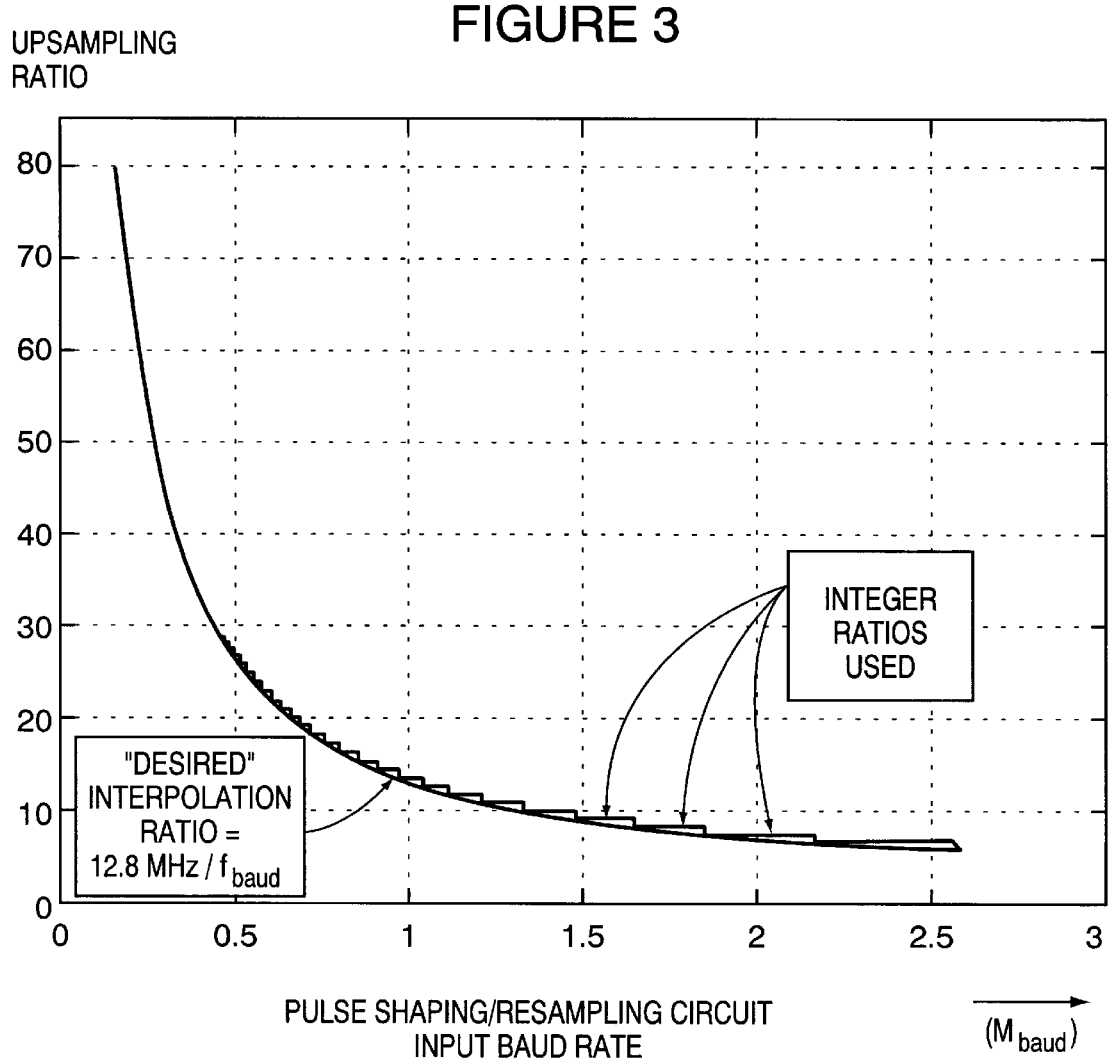
FIG. 3 illustrates upsampling ratios used for a plurality of input baud rates in a first exemplary embodiment.

FIG. 3 shows the relationship between a desired Nyquist interpolation ratio $INTERP_{DESIRED}$ and the nearest integer interpolation ratio that can be used $INTERP_{USED}$, given an input baud rate $f_{baud}$ and the use of a resampling circuit which supports downsampling; where $$INTERP_{DESIRED} = f_{pulseshape} / f_{baud}; \text{ and}$$

$$INTERP_{USED} = CEIL(INTERP_{IDEAL}),$$

where CEIL is a ceiling function which selects the lowest integer greater than or equal to its argument. These interpolation ratios are shown for a final pulse shaped sampling rate (e.g., into the mixer 212) of 12.8 MHz, and for baud rates of 160 kbaud to 2.56 Mbaud, in increments of 10 kbaud.

Figure 4:
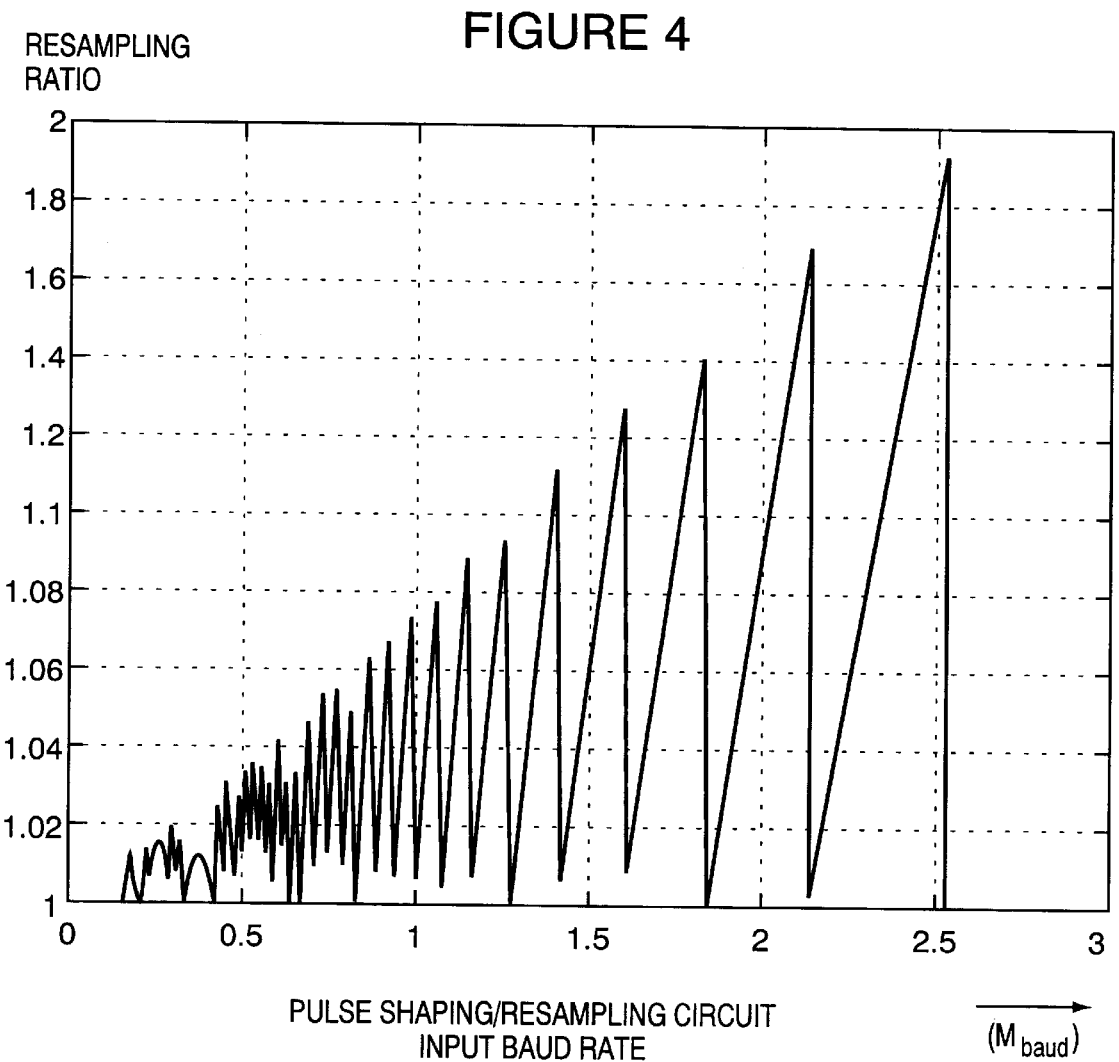
FIG. 4 illustrates resampling ratios used for a plurality of input baud rates in the first exemplary embodiment.

The resampling ratios, INC, that are required are the ratios of:

$$INC=INTERP_{USED}/INTERP_{DESIRED},$$

for each desired input baud rate, which is shown in FIG. 4. FIG. 4 shows, in the vertical dimension, the resampling ratio to be used by the resampling circuit 208 given a desired input baud rate shown in the horizontal dimension and a fixed output baud rate of 12.8 Mbaud. That is, FIG. 4 illustrates the desired ratio of the resampler circuit's input sample rate to the re-sampler circuit's output sample rate. Note that the resampling ratios INC are less than two, for the cases shown in FIG. 4. Therefore, in such an embodiment the input sampling rate to the resampling circuit 206 will be:

$$f_{resampler,in}=INC*f_{resampler,out}=INC*12.8<25.6 \text{ MSPS}.$$

The circuitry ahead of the resampler can operate on a fixed 25.6 MHz clock, with samples dropped when not needed. The dropping of unnecessary samples results in what is referred to herein as a "stuttering" clock.

Note that although the samples out of the symbol mapper 202, Nyquist filter 206, and resampling circuit 208 come at non-uniform intervals due to the use of a stuttering clock, they represent, in each case, samples coming, at predictable intervals. The samples are just calculated at non-uniform times. In the case where a buffer, e.g., FIFO 210 is used, the FIFO smoothes, in terms of time spacing, these unevenly spaced samples out so that at the FIFO's output there exists a correct and uniformly-spaced sample stream having a sample rate $f_{RESAMPLER,OUT}$. In the exemplary FIG. 4 case, the FIFO output stream has a fixed sample rate of 12.8 megasamples per second (MSPS).

The FIFO 210 can be implemented as a very small buffer. When the buffer fullness, i.e. FIFO fullness, falls below a predefined level, enable control signals are sent to the resampling circuit 208, and Nyquist filter 206, so that resampling circuit input signals will be produced. Resampling circuit outputs are then produced, as a function of the stuttering clock signals discussed above, at an average rate of $$f_{resampler,out}=25.6 \text{ MSPS}/INC,$$

which is greater than 12.8, until the FIFO is filled up to the predefined level.

During this process, as the Nyquist interpolating filter 206 operates, it sends a signal to the symbol generator every $INTERP_{Nyquist}$ input samples controlling, e.g., instructing, the symbol operator to provide a new symbol to the filter 206.

Figure 5:
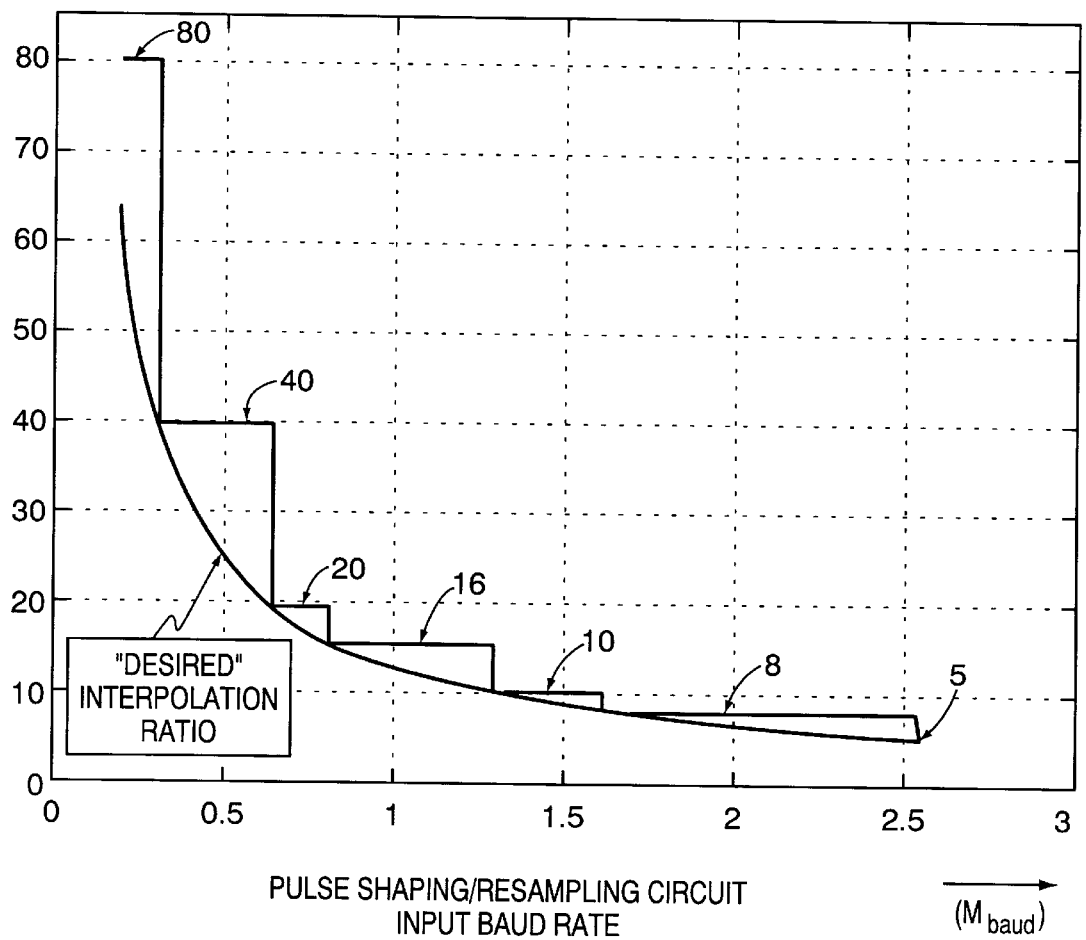
FIG. 5 illustrates upsampling ratios used for a plurality of input baud rates in a second exemplary embodiment.

FIG. 5 shows the relationship between the desired Nyquist interpolation ratio $INTERP_{DESIRED}$ and the nearest interpolation ratio $INTERP_{USED}$ that is available, when the Nyquist interpolation rate is to be greater than or equal to $INTERP_{DESIRED}$ and also is to be an integral divisor of 80. That is, FIG. 5 relates to an embodiment where the Nyquist filter 206 includes an upsampling filter designed for a maximum ratio of 80, and with subsets of the filter coefficients that can be used for lower upsampling ratios that are divisors of 80. These interpolation ratios are shown in FIG. 5 for a final pulse shaped sampling rate, e.g., into the mixer 212, of 12.8 MHz, and for baud rates of 160 kbaud to 2.56 Mbaud, in increments of 10 kbaud.

Figure 6:
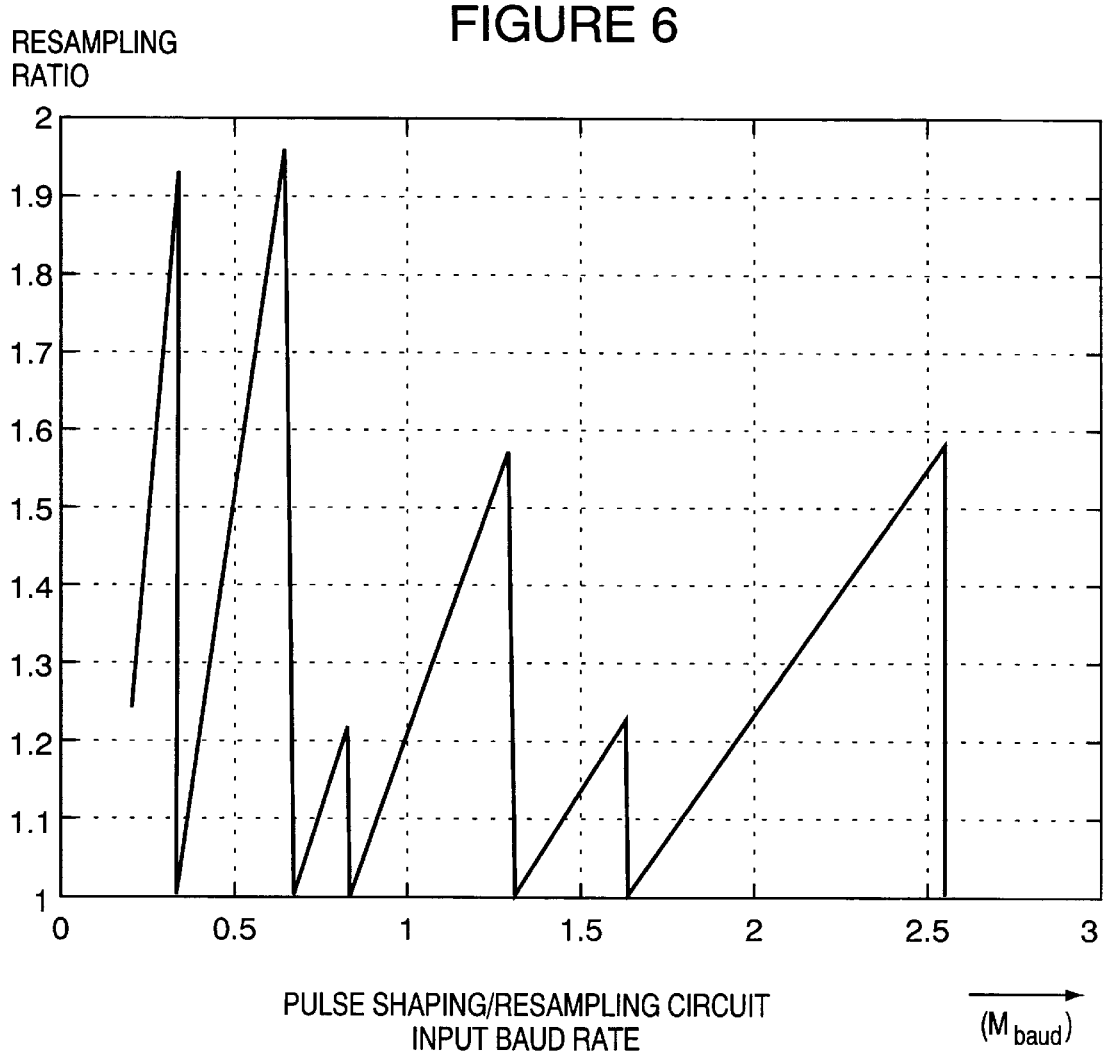
FIG. 6 illustrates resampling ratios used for a plurality of input baud rates in the second exemplary embodiment.

The resampling ratios INC, that are to be used with the same Nyquist filter 206 discussed above with regard to FIG. 5, are the ratios of $$INC=INTERP_{USED}/INTERP_{DESIRED},$$

for each desired baud rate, as shown in FIG. 6. FIG. 6 thus shows the action required to be performed by the resampling circuit 208 as a function of a given input desired baud rate: that is, the ratio of resampler input sample rate to resampler output sample rate. The resampling ratios INC are always less than two, for this particular exemplary embodiment, as well. Therefore, the input sampling rate to the resampler will always be less than 25.6 MSPS.

While the use of symbol mapper, Nyquist filter and resampling circuit, control signals have been described in the context of the exemplary embodiment, it is to be understood that these signals could be replaced with clock signals which are generated as a function of, e.g., the fixed output sample rate of the FIFO 210 and the input symbol rate of the symbol mapper 202.

The methods and apparatus of the present invention are useful in systems that require flexibility in symbol rate selection. Such systems include cable modems and other modulation devices.

While the present invention has been described in the context of embodiments which use integer upsampling ratios for filter 206, a filter which supports non-integer upsampling ratios could also be used as the filter 206. In addition, while an optional FIFO 210 has been described, it is possible to control the output rate of the resampling circuit 208 so that the resampling circuit's output samples are generated at the desired fixed mixer input rate. Such an embodiment eliminates the need for the FIFO 210. It should also be noted that a single control signal, e.g., enable/disable signal, could be used to control the signal mapper 202, interpolating filter 206 and resampling circuit 208. In the case where the optional FIFO 210 is not used, it should also be noted that a single control signal, e.g., enable/disable signal, could be used to control the signal mapper 202 and interpolating filter 206.

What is claimed is:

1. A signal processing system, comprising:
   a digital interpolating filter for generating an interpolated signal from an input signal having an input sample rate, the interpolated signal having a higher sample rate than the input signal; and
   a re-sampling circuit coupled to the digital interpolating filter for generating a re-sampled signal from the interpolated signal, the re-sampled signal including non-uniformly spaced samples and having a sample rate which is higher than the input sample rate.

2. The signal processing system of claim 1, further comprising:
   a buffer coupled to the output of the resampling circuit for generating, from the re-sampled signal, an output signal including uniformly spaced samples.

3. The signal processing system of claim 2, wherein the resampling circuit includes a control input for receiving a control signal from the buffer.

4. The signal processing system of claim 2, further comprising:
   a symbol mapper, coupled to an input of said filter, for generating said input signal, said input signal including symbols.

5. The signal processing system of claim 1, wherein said interpolating filter is a programmable pulse shaping filter which performs interpolation.

6. The signal processing system of claim 1, wherein said interpolating filter is a pulse shaping filter which performs interpolation.

7. The signal processing system of claim 6, wherein said interpolating filter is a Nyquist filter.

8. The signal processing system of claim 6, further comprising:
a mixer coupled to said buffer, for performing a mixing operation using the samples output by said buffer.

9. The signal processing system of claim 8, further comprising:
a symbol mapper, coupled to an input of said filter, for generating said input signal, said input signal including symbols.

10. The signal processing system of claim 9, further comprising an interpolation circuit having a fixed interpolation rate coupled to the mixer.

11. The signal processing system of claim 1, wherein the re-sampled signal includes fewer samples than the interpolated signal.

12. The signal processing system of claim 1, wherein the re-sampled signal includes more samples than the interpolated signal.

13. A signal processing system, comprising:
a digital interpolating filter for generating an interpolated signal from an input signal having an input sample rate, the interpolated signal having a higher sample rate than the input signal, the digital interpolating filer including a control input for receiving a control signal; and
a re-sampling circuit coupled to the digital interpolating filter for generating a re-sampled signal from the interpolated signal and including a digital interpolating filter control signal output coupled to the control input of said digital interpolating filter, the re-sampled signal having a sample rate which is higher than the input sample rate.

14. A method of processing an input signal having a first sample rate, the method comprising the steps of:
filtering the input signal to produce an interpolated signal having an interpolated sample rate which is higher than the first sample rate;
performing a resampling operation on the interpolated signal to produce a re-sampled signal including non-uniformly spaced samples and having a second sample rate which is different than the interpolated sample rate, the second sample rate being higher than the first sample rate.

15. The method of claim 14, wherein the filtering operation performs interpolation at a rate of N times the input sample rate, the interpolated signal rate being N times the first sample rate, wherein N is a positive integer.

16. The method of claim 15,
wherein the input sample rate is X Hz, and
wherein the step of performing a resampling operation includes the step of:
resampling the interpolated signal to produce a resampled signal having a sample rate equal to X times N, minus Y, where Y is a value in the range of 0 to X.

17. The method of claim 14, wherein the resampled signal includes fewer samples th an the interpolated signal.

18. The method of claim 17, further comprising the step of:
using a buffer to smooth the amount of time between each of the samples included in the re-sampled signal and to output uniformly spaced samples.

19. The method of claim 18, wherein said buffer is a first-in, first-out buffer.

20. The method of claim 17, further comprising the step of:
performing a mixing operation, as a function of the samples output by said resampling operation, to generate a transmission signal.

21. The method of claim 20, wherein the input signal includes symbols, the method further comprising the step of:
operating a symbol mapper to generate said input signal.

22. The method of claim 15, wherein the resampled signal includes more samples than the interpolated signal.

23. The method of claim 22, further comprising the step of:
using a buff er to smooth the amount of time between each of the samples included in the re-sampled signal and to output uniformly spaced samples.

24. The method of claim 23, wherein said buffer is a first-in, first-out buffer.

25. The method of claim 22, further comprising the step of:
performing a mixing operation, as a function of the samples output by said resampling operation, to generate a transmission signal.

26. The method of claim 25, wherein the input signal includes symbols, the method further comprising the step of:
operating a symbol mapper to generate said input signa l.

27. A modulator, comprising:
a symbol mapper;
an interpolating filter including a data input coupled to the symbol mapper, a data output and a control input;
a resampling circuit including a data input coupled to the interpolating filter data output, and further including a control signal output coupled to the interpolating filter control signal input; and
a mixer coupled to said resampling circuit.

28. The modulator of claim 27, further comprising:
a buffer for coupling the resampling circuit to the mixer.

29. The modulator of claim 28, wherein the interpolating filter is a programmable filter capable of outputting N samples for each sample input to the filter, where N is a positive integer.

30. The modulator of claim 29, further comprising:
a fixed rate interpolation circuit coupled to the mixer.

31. The modulator of claim 29, wherein the buffer is a first-in, first-out buffer which outputs uniformly spaced samples.

32. The modulator of claim 27,
wherein the interpolating filter is a programmable filter capable of outputting N samples for each sample input to the filter, where N is a positive integer; and
wherein the resampling circuit resamples an interpolated signal generated by the interpolating filter to produce a re-sampled signal having more samples than the interpolated signal.

33. The modulator of claim 27,
wherein the interpolating filter is a programmable filter capable of outputting N samples for each sample input to the filter, where N is a positive integer; and
wherein the resampling circuit resamples an interpolated signal generated by the interpolating filter to produce a re-sampled signal having fewer samples than the interpolated signal.

* * * * *